United States Patent
Roark, Sr.

[11] Patent Number: 5,472,574
[45] Date of Patent: Dec. 5, 1995

[54] SPINNING BAND

[76] Inventor: Roger R. Roark, Sr., 9119 Centerville Rd., Easton, Md. 21601

[21] Appl. No.: 87,448
[22] Filed: Jul. 9, 1993
[51] Int. Cl.$^6$ ..................... B01D 3/14
[52] U.S. Cl. ............ 202/153; 202/158; 202/237; 202/238
[58] Field of Search ............... 202/153, 158, 202/265, 175, 237, 238, 267.1; 203/86; 159/6.2

[56] References Cited

U.S. PATENT DOCUMENTS

| | | | |
|---|---|---|---|
| 2,333,712 | 11/1943 | Eckey | 202/153 |
| 2,575,690 | 11/1951 | Smith | 202/238 |
| 2,608,528 | 8/1952 | Piros et al. | 202/161 |
| 2,712,520 | 7/1955 | Nester | 202/153 |
| 2,880,979 | 4/1959 | Wheeler | 202/153 |
| 3,080,303 | 3/1963 | Nerheim | 202/161 |
| 3,240,682 | 3/1966 | Gordon | 202/161 |
| 3,292,683 | 12/1966 | Büchi et al. | 202/238 |
| 3,372,095 | 3/1968 | Nester | 202/238 |
| 3,390,963 | 7/1968 | Wiegandt | 202/238 |
| 4,770,746 | 9/1988 | Mayo et al. | 202/238 |

FOREIGN PATENT DOCUMENTS

| | | | |
|---|---|---|---|
| 0596392 | 1/1948 | United Kingdom | 202/153 |
| 0614388 | 12/1948 | United Kingdom | 202/153 |

OTHER PUBLICATIONS

Birch et al., "Spinning Band Column for High Vacuum Fractionation"; J.S. Cl. I. 66, Feb. 1947, pp. 33–40.

Primary Examiner—Virginia Manoharan

[57] ABSTRACT

Bands used in fractionating columns, and more specifically, to the type made from either a metal screen strip or from a Teflon sheet twisted into a helicoid. In addition to previously documented design characteristics, the present spinning band includes a number of additional, circular apertures cut into the face of the metal screen strip and Teflon sheet. The circular apertures, sequentially arranged along the centerline of the band, add to the operating efficiency of the spinning band as it is employed in a fractionation process.

4 Claims, 2 Drawing Sheets

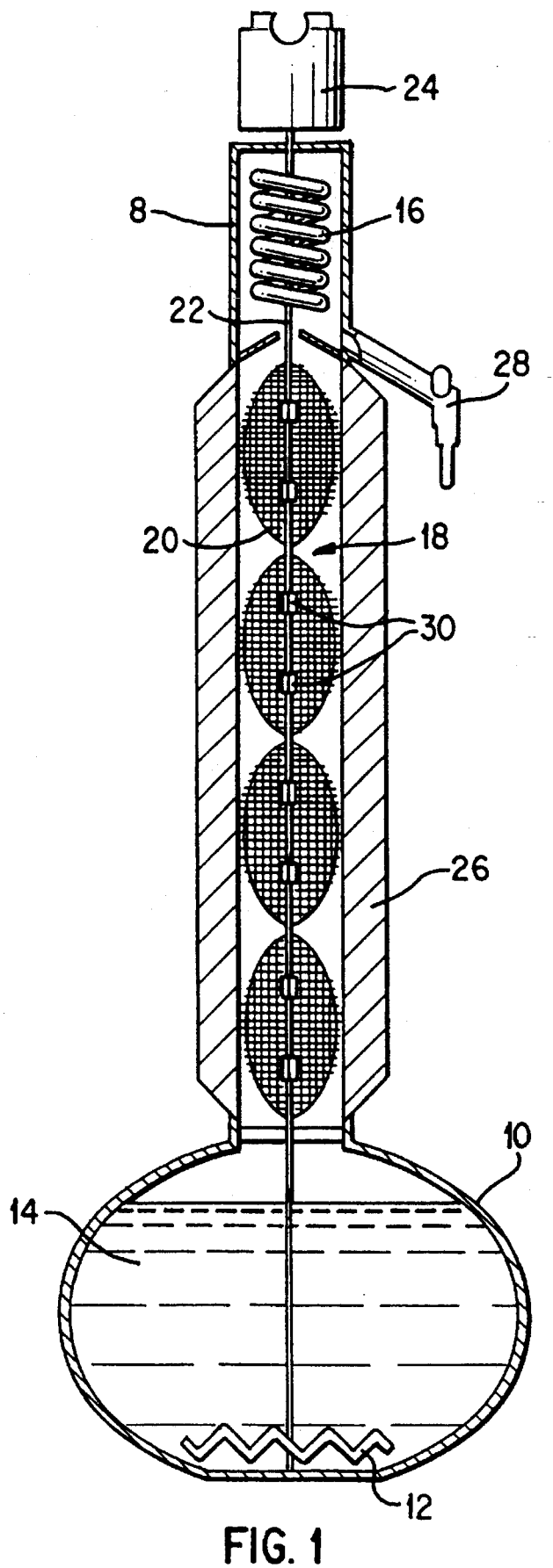
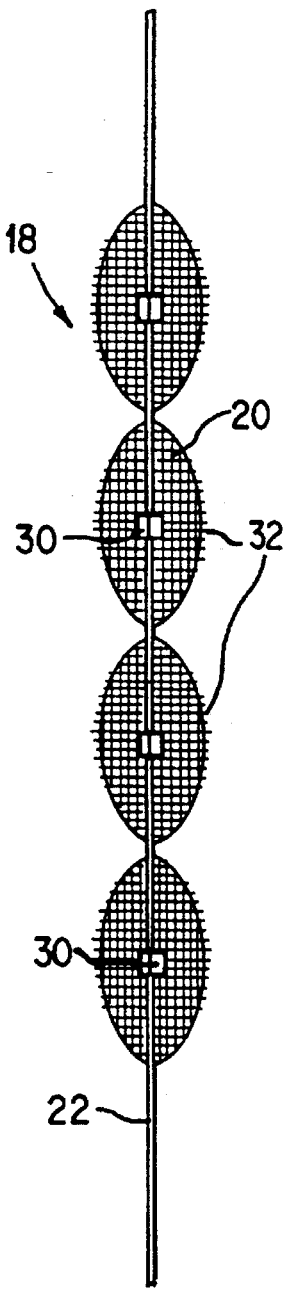
FIG. 1
FIG. 2

SPINNING BAND

BACKGROUND OF THE INVENTION

This invention relates to fractional distillation apparatus, and more particularly, to fractionating columns of the spinning band type.

In the chemical industry, it is common practice to use distillation apparatus in order to separate liquid mixtures having different boiling points. Although various types of stills have been used, most have common features: a still pot holding a charge to be separated, a vertically disposed fractionating column immediately above and communicating with the still pot, a condenser section located at the upper portion of the column, controllable heater means disposed in the still pot, and liquid take-off means running from the condenser. In order to assure an adiabatic separation process, many stills incorporate a vacuum jacket, often silvered, in order to prevent heat transfer around the fractionating column.

Efficiency in a fractionating still is a measure of the degree of enrichment or rectification of one compound as it is being separated from others within the column. This separation is invariably achieved through the intimate contact between the vapors rising from the still pot and the liquid or reflux descending within the column. As this liquid/vapor contact occurs, the result is that only the most volatile material proceeds upward towards the receiver, while the less volatile material returns downward as a liquid towards the still pot. Thus, the efficiency of the separation process depends on the frequency and degree of contact between the ascending vapor and the descending liquid. As this contact becomes more intimate and frequent, the fractionation will become more efficient.

As a separating medium, a number of stills of the 'packed column' type have employed various types of stationary fillers situated in the column in order to result in effective liquid/vapor contact. These packings have included glass beads, ceramic saddles, glass and metal helices, metal screens formed into cones, metal chains, rings, conical discs, and a number of other materials of different shapes, all fitted very tightly between the walls of the column. Although these packed column stills can provide a high degree of fractionation, they do have a number of shortcomings. One is that effective operation is conditional on proper packing, and that packings often become disarranged in the course of distillations. Sometimes, the amount of packing is so great that the holdup inherent in these types of stills renders them unsuitable for fractionating small quantities of liquids. When operating at reduced pressure, the packed column design makes it extremely difficult to obtain both an acceptable separation efficiency and a relatively low pressure drop between the still and the column head, the latter being especially crucial in avoiding decomposition of compounds having high molecular weights.

In addition to distillation columns having stationary packings, a number of separating columns having mechanically moving parts have been proposed. These types of columns usually spin some type of band, cone, brush, or wiper in the center of the column in order to affect better mixing and contact of the falling liquid with the rising gas. In general, these types of columns have been extremely successful at affording good overall liquid/vapor dispersion (i.e., high efficiency), very low holdup in the column, high numbers of theoretical plates for a given column length, and low pressure drop as compared to their packed column counterparts.

Yet, in the early development of these types of columns involving moving parts, problems associated with fractionation at high vacua often arose. Ordinary packings and bearings were not reliable in maintaining sufficiently tight seals around the rotating members. Fortunately, the development of magnetic as well as other specialized types of bearings has eliminated all vulnerable leakage points around the moving parts of these stills, and they are now extremely reliable when run at reduced pressure.

One specific type of distillation apparatus which spins a band throughout a major portion of the length of the column is called the 'spinning band column'. Generally, the spinning bands incorporated in these types of distilling columns take on a spirally wound shape, and are just wide enough to lightly scrape the surrounding walls of the column when they are rotated. The spiral shape, giving the band the appearance of an elongated helicoid, produces an axial thrust as the band is spun at high rpm's. Thus, when rotated at high speeds and in the proper direction, these spinning bands force the reflux downward along the walls of the column in a quick and uniform manner. This latter feature is especially helpful in preventing these types of fractionating columns from flooding, even when operated at high boil-up rates.

Many efforts regarding spinning band columns have focused on improvements to the spinning band itself. As previously mentioned, efficiency is dependent on the liquid/vapor contact within the column. Towards this end, most advances in these types of columns have come from improvements to the spinning band which facilitate better mixing of the liquid and gas within the column. It is with this objective that the present invention is concerned.

BEST KNOWN PRIOR ART

The spinning band was first used to increase the efficiency of a fractionating process in the late 1930's. Over the course of time, the spinning band method was experimented with in order to ascertain its true potential in the chemical distillation industry.

In search of a distillation column which could combine reasonable efficiency with low pressure drop under vacuum conditions, Birch et al. conducted a thorough experiment with a spinning band column. Their results were published in the February 1947 issue of the *Journal of the Society of Chemical Industry*, a detailed account which describes a spinning band column for use in a high vacuum fractionating process. The experimental results stated that the column was equivalent to 16.6 theoretical plates at atmospheric pressure, and that under vacuum pressure and at a boil-up rate of 300 ml/hr, the total pressure drop amounted to only 0.04 mm of mercury.

By giving operational insight into the performance of the band, their experiment helped establish the significance of the spinning band as a viable fractionating tool. Although Birch et al. twisted the band into a spiral along its center line in order to produce a smoother rotation within the column, it was surprisingly discovered that the band also sprayed the reflux evenly on the column wall. This was important since it resulted in a uniform evaporation from the flask surface. Lastly, Birch et al. did recognize the ability of the spirally wound stainless steel band to assist in the axial flow of material along the interior of the column as the band was rotated at high speeds. However, they rotated the band so that it helped to raise the vapors up the column, and not the liquid down into the still pot (as is conventionally done today).

Recognizing that improved contact along the spinning band's edges with the downward flowing liquid on the column walls would result in higher efficiency, Piros et al. disclosed a new type of microstill in their U.S. Pat. No. 2,608,528. As the spinning element, the Piros et al. microstill incorporated a flattened helical wire coil wound upon a metallic band. This band, having transverse major and minor axes both at right angles to the longitudinal axis, produced 'point' contact or 'wall ridges' with the liquid when rotated in the column. Opposed to conventional 'window-wiping' mechanisms, the Piros et al. spinning band improved fractionating efficiency greatly.

In a series of continuing patents including U.S. Pat. No. 2,764,534, U.S. Pat. No. 2,892,759, and U.S. Pat. No. 3,080,303, Nerheim teaches a number of improvements to the spinning band column fractionator. His earliest patent introduces a novel head for a spinning band distillation column. By minimizing the length of the shaft supporting the spinning band and passing through the head, Nerheim allows for higher rotational speeds without danger of band vibration. His second invention is concerned with providing an improved distillation flask mounting for the conventional spinning band column. The new flask mounting allows for easy recharging of the sample and offers a high degree of protection to the column.

Nerheim's last patent describes a fractionating device which uses a unique type of spinning band. Contrasting traditional metallic spinning bands which are relatively thin, the Nerheim band has a relatively large cross-sectional area with respect to the flow area of the column. In addition, it is constructed from a nonmetallic substance such as Teflon. One advantage of the Nerheim band is that the larger spinning band core leaves less lateral space for the rising gases to travel in making contact with the reflux descending along the column walls. Also, since the Nerheim band has many points of contact with the column walls, his band is more stable in rotation than thin bands having less points of contact. Efficiency in the fractionating process is raised as this latter attribute is coupled with the fact that the band's Teflon construction results in less friction upon being rotated.

The Nester U.S. Pat. No. 2,712,520 teaches a new type of spinning band distillation column having (in one embodiment) a wire gauze strip in the form of a diametral helix passing through the column and attached along its longitudinal axis to a rotatable tungsten wire shaft. An important feature of the Nester patent is that transverse wire strands along the gauze strip extend beyond the outer longitudinal wires and make contact with the inner wall of the column at each end of the strands. This serves two critical purposes, the first being that this type of contact aids in maintaining the shaft in the center of the column during rotation. Second, when the still is in operation, the contact of the transverse wire strands with the column wall produces a number of disturbances in the thin film of descending reflux, and consequently assists in the mixing contact of the vapors with the liquid. A second Nester invention, disclosed in his U.S. Pat. No. 3,372,095, introduces yet another type of spinning band separating still. This distillation apparatus spins a first rod member having a second rod-like element spirally wound on its outer surface. The first and second rod members, both made from the same polymeric material, form an annular spinning band which constricts the vapor path so that the rising vapor must contact the liquid descending along the walls of the column.

A problem with spinning bands whose outer edges scrape the inner walls of the columns in which they are rotated is that this frictional engagement often wears the bands to such an extent that an annular passage is created in between the spinning band and the inner column walls. When this occurs, vapor/liquid contact is minimized as vapors pass through the worn opening without making the desired intimate contact with the falling reflux. The U.S. Pat. No. 2,880,979 issued to Wheeler overcomes this problem through the use of a combination of two elongated spinning bands extending through the column and fixed to one another in a face-to-face relationship. With this arrangement, the first and second spinning bands are constantly urged radially apart by centrifugal force to frictionally engage the side walls of the column, this radial movement continuously compensating for any wear that occurs throughout the length of the spinning bands.

Numerous other improvements have been made to the spinning band type of fractionators. The Klosel U.S. Pat. No. 3,423,782 describes a spinning band which comprises a vertical shaft wrapped with a ribbon like helicoid, and a number of wiper blades disposed in between the turns of the helix and mounted onto the shaft. This combined helix and blade stump rotor is useful for wiping liquids which tend to adhere and stick, as well as those of low viscosity. The U.S. Pat. No. 4,770,746 issued to Mayo teaches a spinning band fractionating column having embedded in its bottom end a magnet which serves as a stirring vane for rotation of the band within the column as the band is placed above an external magnetic field.

SUMMARY OF THE INVENTION

The present invention has as its purpose the provision of a novel spinning band designed to increase the operating efficiency of a fractionating device. Essentially, the invention is an improvement over the metallic helix type of spinning band, and more specifically, over the spinning band introduced by Nester in his U.S. Pat. No. 2,712,520.

The helicoid spinning band, constructed from a metal gauze or screen material, has proven useful in fractionating apparatuses. Since the primary objective of a distillation process is to increase efficiency through intimate liquid/ vapor contact, spinning band columns with higher rpm's are desirable. In other words, faster spinning band rotation which causes more disturbances in the reflux and increased turbulence in the gases results in better liquid/vapor mixing. However, problems associated with the rotation of these bands do exist.

There is a direct correlation between the speed with which a spinning band is turned and the friction created by the band on the column walls. When speeds become too excessive, the heat generated by the friction of the band rubbing against the column wall disrupts the equilibrium of the separation process. Also, as the bands are spun more and more rapidly, increased vibrations usually result. Subsequently, the optimum speed at which a spinning band is rotated is a balance between effective liquid/gas mixing and harmful heat and vibration created by the band itself.

It has been discovered that the provision of relatively large holes in the face of a spinning band made from a twisted strip of metal gauze adds to the efficiency of a fractionation process. The basic design of the spinning band is consistent with those mentioned in the prior art. The face of the spinning band, joined along its longitudinal centerline to a rotatable shaft, has a number of lateral strands extending beyond the outer longitudinal strands so as to lightly make contact with and scrape the column walls as the band is spun.

Experiments have shown that efficiency is maximized when the twisted strip is constructed from a screen having roughly one hundred and fifty meshes per inch.

Thus far, the relatively large holes in the spinning band have been sequentially arranged along the central axis of rotation of the band. For ease in cutting the holes, they have been made circular. Empirical results have suggested that the diameter of the holes should be roughly twenty-five percent of the width of the band.

It is not known exactly why the provision of the circular holes along the centerline of the spinning band increases the efficiency of the fractionation process. It is hypothesized that the elimination of material along the centerline of the band has the positive effect of increasing the 'open area' without harming the band's ability to mix the rising vapors with the falling reflux. Although an exact explanation of how the apertures add to the efficiency of the band does not presently exist, the empirical results thus far gathered using the spinning band with holes arranged along its centerline do indicate a consistent improvement in operating efficiency.

It has also been discovered that the provision of apertures in the face of a spinning band made from a twisted sheet of Teflon adds to the efficiency of a fractionation process. As previously mentioned, the use of Teflon as a spinning band material is advantageous when the band is subjected to extremely high rotational speeds since the frictional heat created along the edge of the band and inner column wall is minimized. Teflon bands are also preferred over metal bands when fractionating highly corrosive mixtures. Experimental results have suggested that the ideal placement of the holes along the Teflon spinning band is a staggered sequence along the outer portion of the band, and not along the central longitudinal axis (as with the band constructed from metal screen material). Otherwise, the design of the Teflon spinning band is essentially the same as the metal screen band, as both are twisted along their length into a spiral to result in uniform liquid dispersion and as both have rough outer edges to cause disturbances in the falling film of reflux.

OBJECTS OF THE INVENTION

It is an object of this invention to provide a novel, spinning band for use in a fractionating column.

Another object of this invention is to provide a unique spinning band made from a metal screen strip wrapped into a helix along a rotatable shaft and having a number of circular apertures sequentially arranged along the central axis of rotation.

To provide a novel spinning band made from a sheet of Teflon material twisted about a rotatable shaft into a spiral and having a number of apertures sequentially arranged in a staggered format along the outer portion of the face of the Teflon sheet is still another object of this invention.

And to provide a spinning band which adds to the operating efficiency of a distillation process is yet another object of this invention.

BRIEF DESCRIPTION OF THE DRAWINGS

These and other objects and attendant advantages of this invention will become more obvious and understood from the following detailed specification and accompanying drawings, in which:

FIG. 1 is a front elevation, partially in section, of a fractionating column having a spinning band which incorporates novel features of this invention;

FIG. 2 is a front elevation of a metal screen spinning band of the fractionating column of FIG. 1.

DESCRIPTION OF THE PREFERRED EMBODIMENTS OF THE INVENTION

Figure 3:
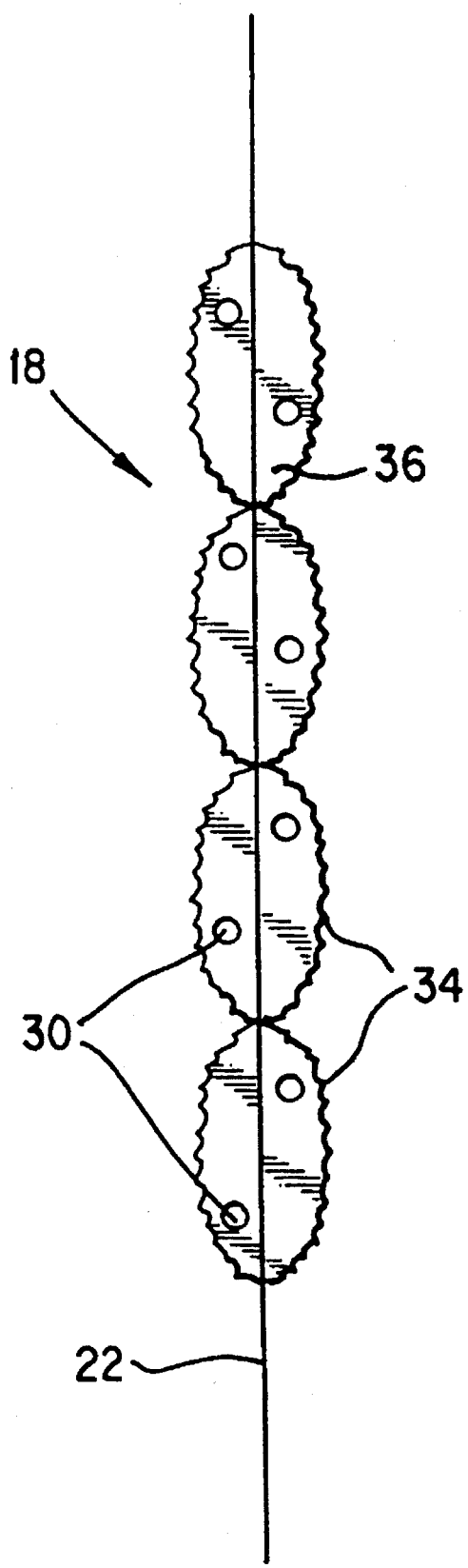
FIG. 3 is a front elevation of a Teflon spinning band for use in the fractionating column of FIG. 1.

Referring now to FIGS. 1 to 3 of the drawings, there is shown the preferred embodiment of a spinning band device embodying novel principles of this invention. A typical still which rotates the spinning band 18 of the present invention is seen in FIG. 1. The still includes a still pot 10, distillation column 8, and condenser portion 16. A heating element 12 is disposed in the lower portion of the still pot 10 which holds the charge 14 to be separated. The length of the column 8 below the condenser 16 and above the still pot 10 is surrounded by a silvered, evacuated jacket 26. A take-off valve assembly 28 is located just below the condenser 16. A variable speed motor 24 is coupled to a shaft 22 which holds a twisted, metal screen strip 20.

Operation of the still begins as the heating element 12 vaporizes a portion of the charge 14. When the first drop appears to form near the condenser 16, the motor 24 is activated so as to turn the spinning band 18. As the spinning band 18 rotates in order to mix the rising vapors with the falling liquid, the ratio of liquid being released through the take-off valve 28 to that running down the walls of the column 8 will eventually decrease, and the first stage in the fractionation process will draw near its end. The heating element 12 will stay at a pre-determined temperature until all of a given component has been drawn off of the condenser portion 16 through the take-off valve assembly 28, at which time the heating element 12 will increase its temperature to a degree suitable to vaporize the component with the next highest boiling point. Any suitable container may be used to contain each distinctive portion of the liquid once it has been released through the take-off valve 28.

The spinning band 18 of the present invention is seen more clearly in FIG. 2. The band 18 is constructed from a metallic screen strip 20 twisted into a helix and joined along its longitudinal centerline to a thin, rotatable shaft 22. In the preferred embodiment, the metallic screen will have 130 to 170 meshes per inch. In order to provide better mixing of the liquid with the gases, the outer ends 32 of the band 18 are 'feathered'. This is simply the result of removing the outer longitudinal strands on each side of the screen strip 20 so that the lateral strands make light contact with the inside wall of the column 8. As has been discovered in the past, this design feature is significant because the disturbances caused by the frayed ends 32 in the reflux descending along the walls of the column 8 add dramatically to the efficiency of the process by causing more intimate liquid/vapor contact.

Another spinning band 18 having novel features in accordance with those of the present invention is seen in FIG. 3. This band 18 is constructed from a Teflon sheet 36 twisted into a spiral and, like the metal screen strip 20 of the previous band 18, is joined along its longitudinal centerline to a rotatable shaft 22. The spinning band 18 made of Teflon 36 as depicted in FIG. 3 may also be used in the fractionating column of FIG. 1. The choice of a spinning band 18 made from metal screen 20 or Teflon 36 would depend on the type of fractionation to be performed. As with the metal screen strip 20 of the first band 18, the Teflon sheet 36 of this band 18 is provided with jagged edges 34 for better liquid/vapor contact along the walls of the column 8.

The novel feature of the present invention, seen in all three of the figures, is the provision of apertures 30 in the face of the metal screen strip 20 and Teflon sheet 36. These apertures 30, depicted as circular, are sequentially arranged along the centerline of the metal screen 20 of the band 18 of FIGS. 1 and 2. However, they are arranged in a staggered fashion along the outer portion of the Teflon sheet 36 of the band 18 of FIG. 3. Although FIG. 2 only shows four apertures 30, it will be noted that more situated in a plane perpendicular to the page do exist, but are not visible in the figure. The same applies to the band 18 of FIG. 3. The eight circular apertures 30 depicted in FIG. 1 appear elliptical because the band 18 has been rotated about the shaft 22 in order to show all apertures 30 that exist on the screen strip 20. The diameter of the apertures 30 is approximately one quarter of the width of the metal screen strip 20 or Teflon sheet 36.

The exact function of the apertures 30 is not known. However, empirical results suggest that the increase in the 'open area' of the band does add to the efficiency of the fractionation process. Furthermore, it has been discovered that aligning the apertures 30 along the centerline of the metal screen strip 20 produces optimal results, as does staggering the apertures 30 along the face of the Teflon sheet 36. The circular shape of the apertures 30 is not crucial, but is preferred for machining purposes. Also, the exact number of apertures 30 may vary depending on the particular size of spinning band 18 or still being used.

It should be clear that the invention is not limited to the previous descriptions and drawings, which merely illustrate the preferred embodiment. Slight departures may be made within the present scope of the invention. For example, twenty square apertures 30 may be provided along the face of a spinning band 18, rather than the eight or so circular apertures 30 shown. Therefore, the scope of the invention is meant to embrace any and all equivalent apparatus, as well as all design alterations, included in the appended claims.

What is claimed is:

1. A fractional distillation apparatus, consisting essentially:

a vertically oriented separation column;

a vertically disposed rotatable means extending through a portion of said vertically oriented column;

a metallic screen means, twisted to form a helicoid about a longitudinal centerline and attached to said vertically disposed rotatable means along said longitudinal centerline, forming an axis of rotation, having 130 to 170 meshes per inch, and having a plurality of circular apertures evenly and sequentially arranged along said longitudinal centerline with a diameter ranging in measurement from 10% to 50% of the width of said metallic screen means;

a multiplicity of lateral wire strands, extending beyond said metallic screen means, whereby said multiplicity of lateral wire strands contact an inner side wall of said vertically oriented column during rotation of said metallic screen means about said axis of rotation.

2. A fractional distillation apparatus as recited in claim 1, wherein said plurality of circular apertures have a diameter equivalent to 25% of the width of said metallic screen means.

3. A fractional distillation-apparatus, consisting essentially:

a vertically oriented separation column;

a vertically disposed rotatable means extending through a portion of said vertically oriented separation column;

a Teflon sheet means, twisted to form a helicoid about a longitudinal centerline and attached to said rotatable means along said longitudinal centerline forming an axis of rotation, having jagged edges which contact an inner side wall of said vertically oriented separation column upon rotation of said Teflon sheet means about said axis of rotation, and having a plurality of circular apertures arranged staggeredly on an outer portion of a face of said Teflon sheet means with a diameter ranging in measurement from 10% to 50% of the width of said teflon sheet means.

4. A fractional distillation apparatus as recited in claim 3, wherein said apertures have a diameter equivalent to 25% of the width of said Teflon sheet means.

* * * * *